United States Patent
Jean et al.

[11] Patent Number: 5,897,111
[45] Date of Patent: Apr. 27, 1999

[54] TRANSMISSION UNIT OF AN OFFICE MACHINE

[76] Inventors: Jaw-Kuen Jean, Taipei Hsien; Chuan-Sheng Li, Taipei; Bor-Harn Lin, Taipei Hsien, all of Taiwan

[21] Appl. No.: 08/695,961

[22] Filed: Aug. 13, 1996

[51] Int. Cl.$^6$ .................................................... B65H 5/22
[52] U.S. Cl. ...................... 271/4.08; 271/4.1; 271/10.09; 271/225; 271/902
[58] Field of Search ................................ 271/4.08, 4.1, 271/10.09, 10.11, 225, 902; 475/295, 302, 332, 343

[56] References Cited

U.S. PATENT DOCUMENTS

| 4,865,305 | 9/1989 | Momiyama et al. ................. 271/116 |
| 5,501,444 | 3/1996 | Yukimachi et al. ............. 271/10.11 X |

FOREIGN PATENT DOCUMENTS

| 2123811 | 4/1978 | Germany ............................ 271/10.11 |
| 53-86215 | 7/1978 | Japan ................................. 271/10.11 |

*Primary Examiner*—David H. Bollinger

[57] ABSTRACT

A transmission unit mounted on the machine base of an office automation machine and covered with a cover and controlled to turn a first roller and a second roller, including a gear transmission mechanism, a first roller having a driven gear set at one end, and a second roller having a driven gear set at one end, wherein the gear transmission mechanism includes a motor, a rounded seat raised from the machine base, a drive gear mounted on the rounded seat and coupled to the motor, a first annular gear holder revolvably mounted around the rounded seat and having an upright gear shaft, a second annular gear holder revolvably mounted around the rounded seat and having two upright gear shafts, an auxiliary gear mounted on the machine base, a first planet gear revolvably mounted around the gear shaft of the first annular gear holder and driven by the drive gear to turn the driven gear set of the first roller, a second planet gear revolvably mounted around one upright gear shaft of the second annular gear holder and meshed between the drive gear and the auxiliary gear and driven by the drive gear to turn the driven gear set of the second roller, and a sector gear meshed with the drive gear and forced to turn the driven gear set of the second roller reversely through a fixed angle after the copy or incoming mode.

3 Claims, 6 Drawing Sheets

TRANSMISSION UNIT OF AN OFFICE MACHINE

BACKGROUND OF THE INVENTION

The present invention relates to fax machines, and relates more particularly to the transmission unit of a fax machine which prevents the gears from being jammed, and permits jammed paper to be conveniently pulled out of the machine.

The transmission unit of a fax machine comprises a first roller and a second roller. The first roller and the second roller are simultaneously rotated to advance the thermal paper during the copy or incoming mode. When at the outgoing mode, only the first roller is rotated to feed document. After the copy or incoming mode, the thermal paper is cut automatically or manually. When the thermal paper is cut off, the leading end of the rest thermal paper extends over the thermal printing head which cannot be used for printing. Furthermore, because the gears for power transmission from the motor to the first roller are maintained connected when a paper is jammed in the transmission unit, it is difficult to pull the jammed paper out of the transmission unit of the fax machine.

SUMMARY OF THE INVENTION

The present invention has been accomplished to provide a transmission unit which eliminates the aforesaid drawbacks. According to one aspect of the present invention, the transmission unit is mounted on the machine base of the fax machine and covered with a cover, comprised of a gear transmission mechanism, a first roller having a driven gear set at one end, and a second roller having a driven gear set at one end, wherein the gear transmission mechanism comprises a motor, a rounded seat raised from the machine base, a drive gear mounted on the rounded seat and coupled to the motor, a first annular gear holder revolvably mounted around the rounded seat and having an upright gear shaft, a second annular gear holder revolvably mounted around the rounded seat and having two upright gear shafts, an auxiliary gear mounted on the machine base, a first planet gear revolvably mounted around the gear shaft of the first annular gear holder and driven by the drive gear to turn the driven gear set of the first roller, a second planet gear revolvably mounted around one upright gear shaft of the second annular gear holder and meshed between the drive gear and the auxiliary gear and driven by the drive gear to turn the driven gear set of the second roller, and a sector gear meshed with the drive gear and forced to turn the driven gear set of the second roller through a fixed angle after a copy or incoming mode. Because the planet gears are mounted on a respective annular gear holder which is revolvably mounted on the rounded, the planet gears are forced to disconnect from the driven gear set of the first roller and the driven gear set of the second roller respectively when a jammed paper is pulled backwards. Therefore, a jammed paper can be easily pulled out of the fax machine.

DETAILED DESCRIPTION OF THE PREFERRED EMBODIMENT

Figure 1:
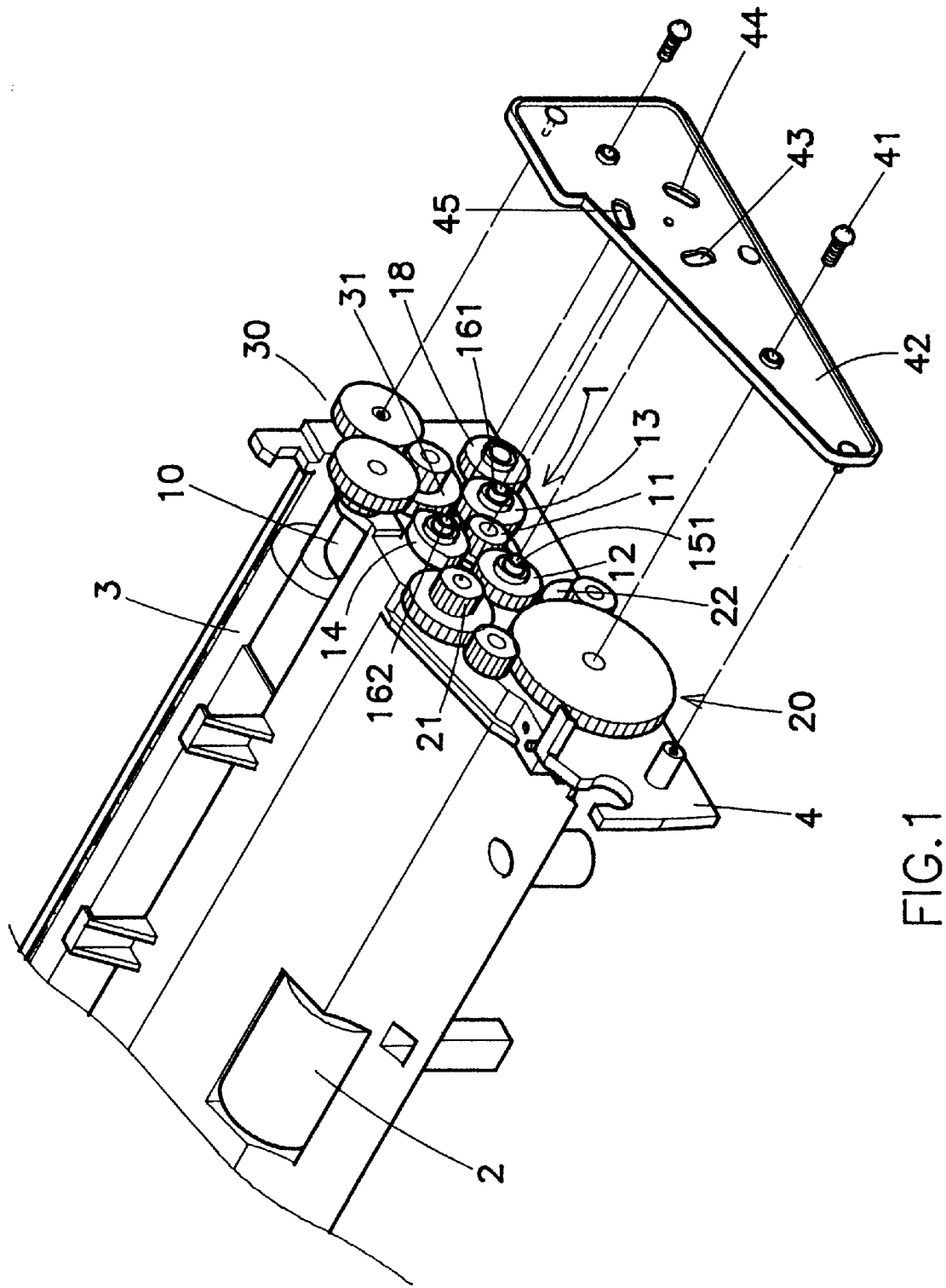
FIG. 1 is an assembly view of the gear transmission unit of a fax machine according to the present invention.
Figure 2:
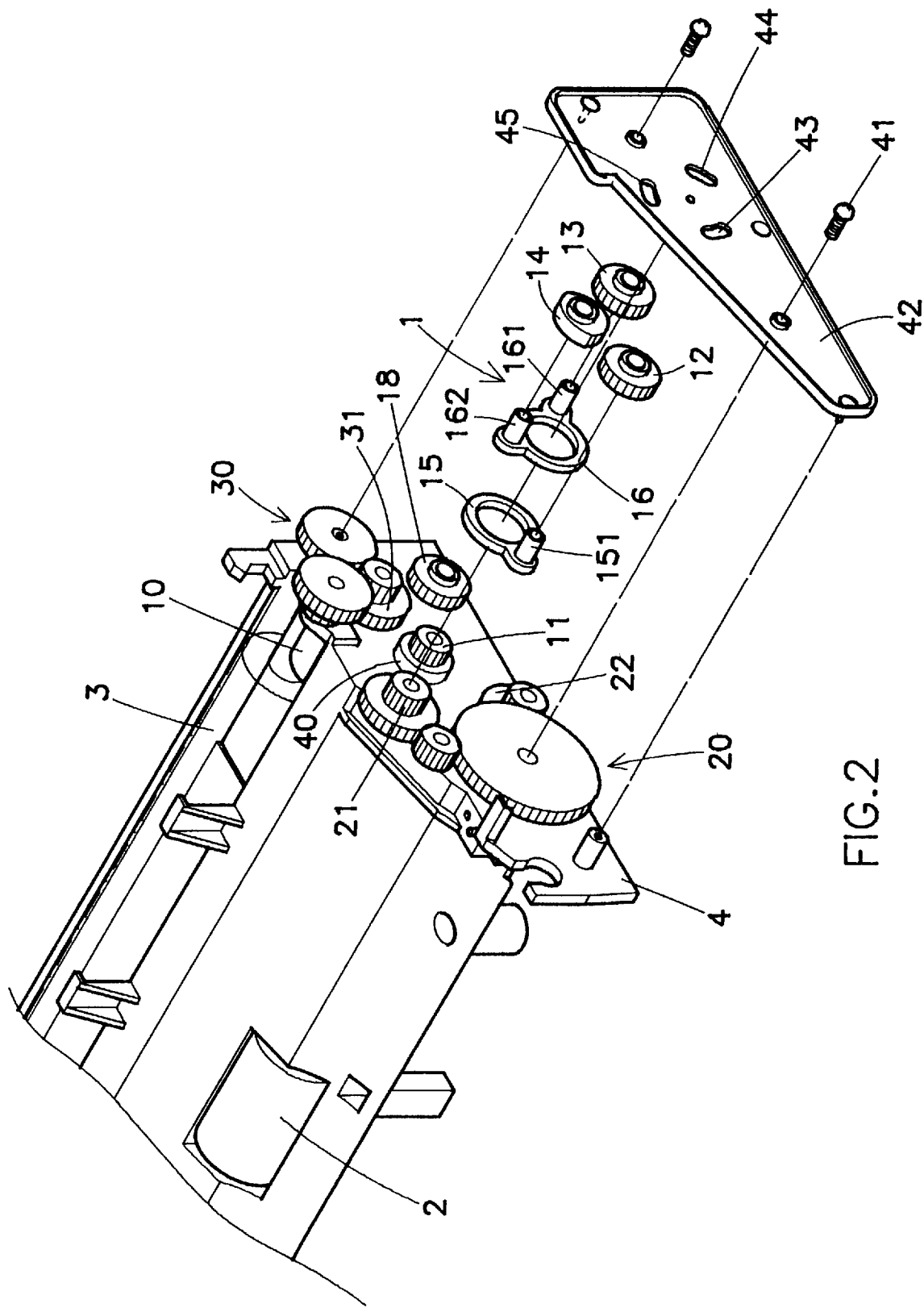
FIG. 2 is an exploded view of the gear transmission unit shown in FIG. 1.

Referring to FIGS. 1 and 2, the transmission unit of a fax machine in accordance with the present invention is mounted on the machine base 4, and comprised of a gear transmission mechanism 1, a first roller 2, and a second roller 3.

The gear transmission mechanism 1 comprises a motor 10, a drive gear 11 mounted on a rounded seat 40 at one side of the machine base 4 and coupled to the output shaft of the motor 10, a first annular gear holder 15 revolvably mounted around the rounded seat 40 and having an upright gear shaft 151, a second annular gear holder 16 revolvably mounted around the rounded seat 40 and having a first upright gear shaft 161 and a second upright gear shaft 162, a first planet gear 12 revolvably mounted around the gear shaft 151 of the first annular gear holder 15 and meshed with the drive gear 11 at one side, a second planet gear 13 revolvably mounted around the first upright gear shaft 161 of the second annular gear holder 16 and meshed with the drive gear 11, a sector gear 14 revolvably mounted around the second upright gear shaft 162 of the second annular gear holder 16 and meshed with the drive gear 11, and an auxiliary gear 18 meshed with the second planet gear 13.

The first roller 2 and the second roller 3 are respectively disposed at two opposite sides by the drive gear 11, having a respective driven gear set 20, 30 respectively mounted on the machine base 4 at two opposite sides relative to the drive gear 11, and adapted to receive driving power from the drive gear 11 through the planet gears 12, 13 and the sector gear 14 The driven gear set 20 of the first roller 2 comprises a first idle wheel 21 and a second idle wheel 22. When the gear transmission mechanism 1, the driven gear sets 20, 30 are installed, a cover 42 is fastened to the machine base 4 by screws 41 and covered over the gear transmission mechanism 1 and the driven gear sets 20, 30. The cover 42 has arched guide slots 43, 44, 45 which receive the upright gear shaft 151 of the first annular gear holder 15 and the upright gear shafts 161, 162 of the second annular gear holder 16 to guide the movement of the first planet gear 12, the second planet gear 13, and the sector gear 14 along the teeth of the drive gear 11 within a fixed angle respectively.

Figure 3:
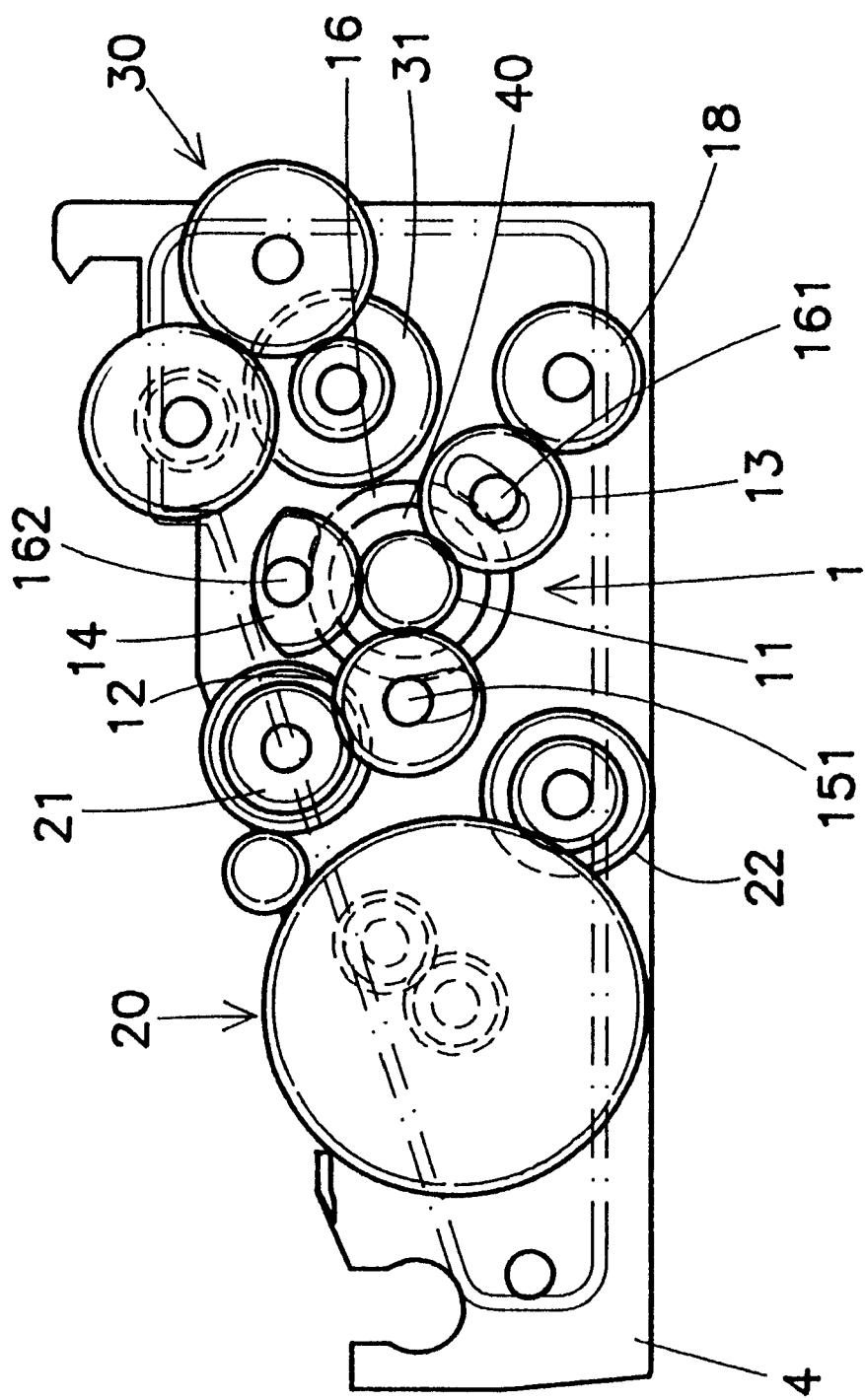
FIG. 3 is an elevation view of the gear transmission unit shown in FIG. 1, showing the motor turned clockwise.

Referring to FIG. 3, when the motor 10 turns clockwise during the outgoing mode of the fax machine, the second roller 3 does no work, the first planet gear 12 of the gear transmission mechanism 1 is forced into engagement with the first idle wheel 21 of the driven gear set 20 of the first roller 2, thereby causing the first roller 2 to be turned to feed document forwards.

Figure 4:
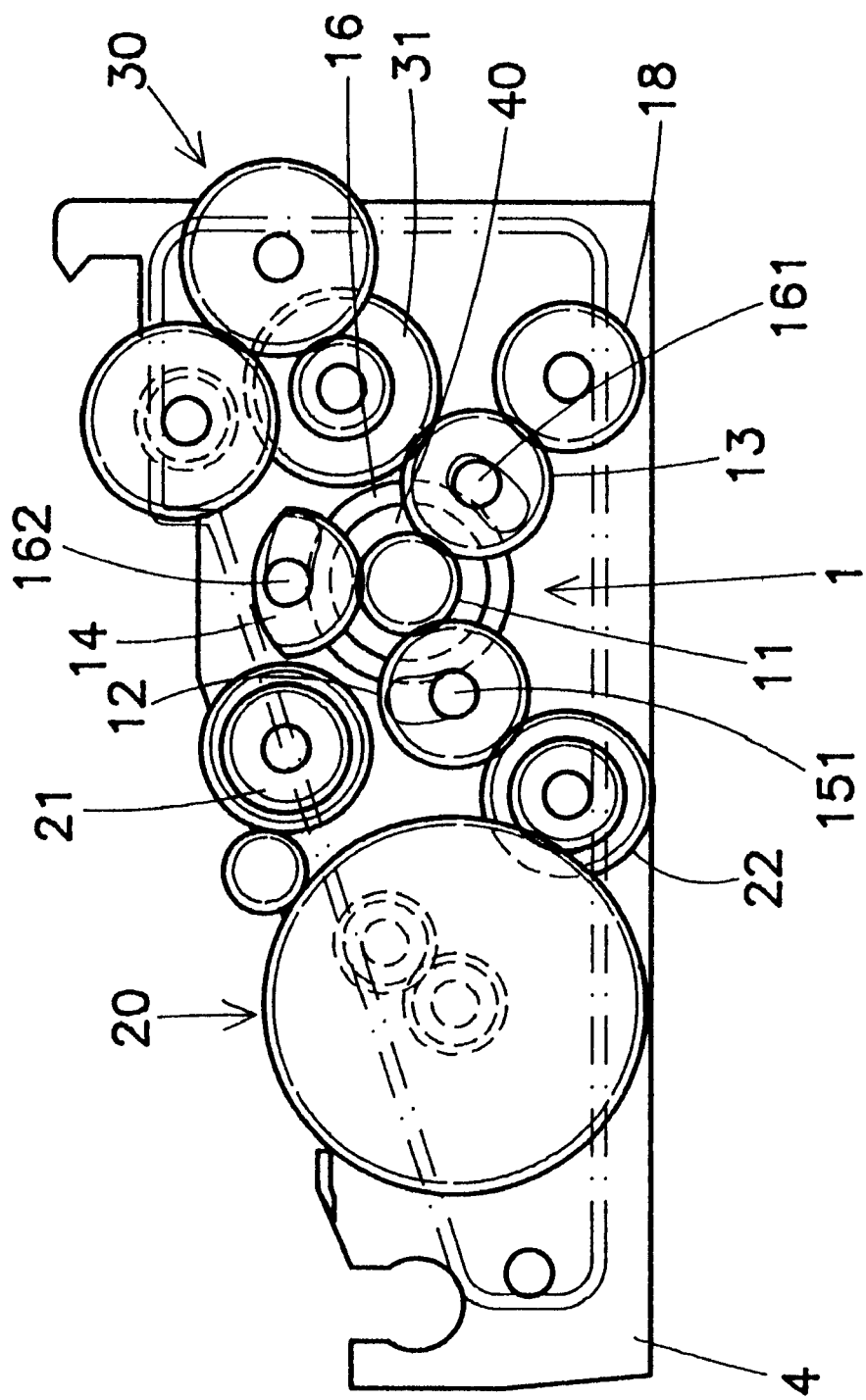
FIG. 4 is another elevation view of the gear transmission unit shown in FIG. 1, showing the motor turned counterclockwise.

Referring to FIG. 4, when the motor 10 turns counterclockwise during the incoming or copy mode of the fax machine, the first planet gear 12 is forced into engagement with the second idle wheel 22 of the driven gear set 20 of the first roller 2, and the second planet gear 13 is forced into engagement with the power input gear 31 of the driven gear set 30 of the second roller 3, and therefore the first roller 2 and the second roller 3 are simultaneously turned to advance the thermal paper.

Figure 5:
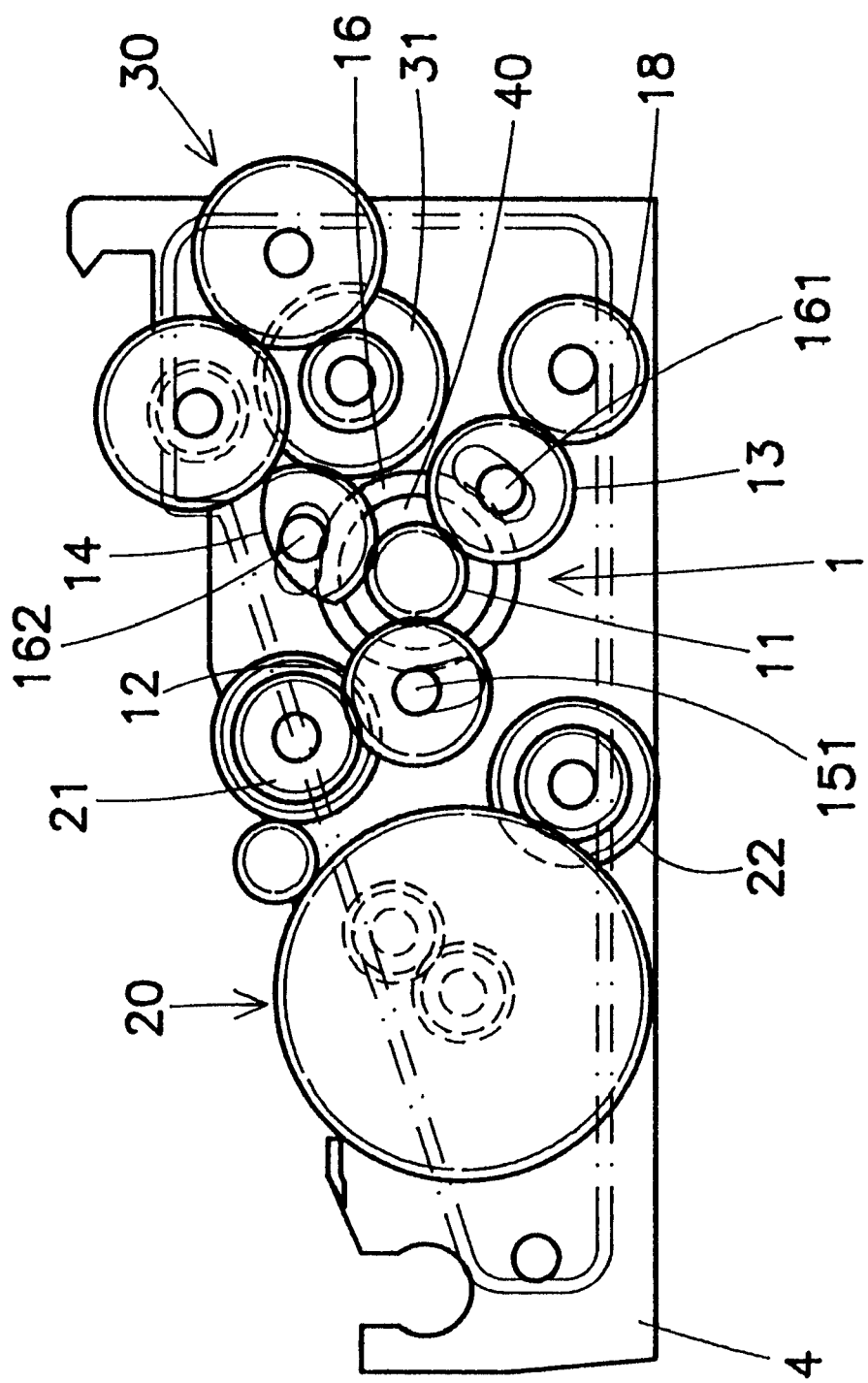
FIG. 5 is still another elevation view of the gear transmission unit shown in FIG. 1, showing the sector gear forced into engagement with the power input gear of the driven gear set of the second roller and turned.

Referring to FIG. 5, when an incoming or copy operation is completed, the motor (step motor) 10 is turned clockwise through a certain number of steps to force the sector gear 14 into engagement with the power input gear 31 of the driven gear set 30 of the second roller 3, causing the second roller 3 to be turned reversely through a certain angle, and therefore the thermal paper is turned to retract its leading end which passes over the thermal printing head. This design saves the consumption of the thermal paper. Further, because the first planet gear 12 and the second planet gear 13 are respectively mounted on the first annular gear holder 15 and the second annular gear holder 16, they are movable relative to each other, and the engagement between the drive gear 11 and the planet gears 12, 13 can be respectively adjusted without causing an interference, and therefore jammed document can be easily pulled out of the machine. Because the annular gear holders 15, 16 are revolvably mounted around the rounded seat 40, when document is pulled back, the planet gears 12, 13 are forced to disconnect from the driven gear sets 20, 30, therefore the drive gear 11 is disengaged from the driven gear sets 20, 30, permitting the first roller and the second roller to be freely rotated.

Figure 6:
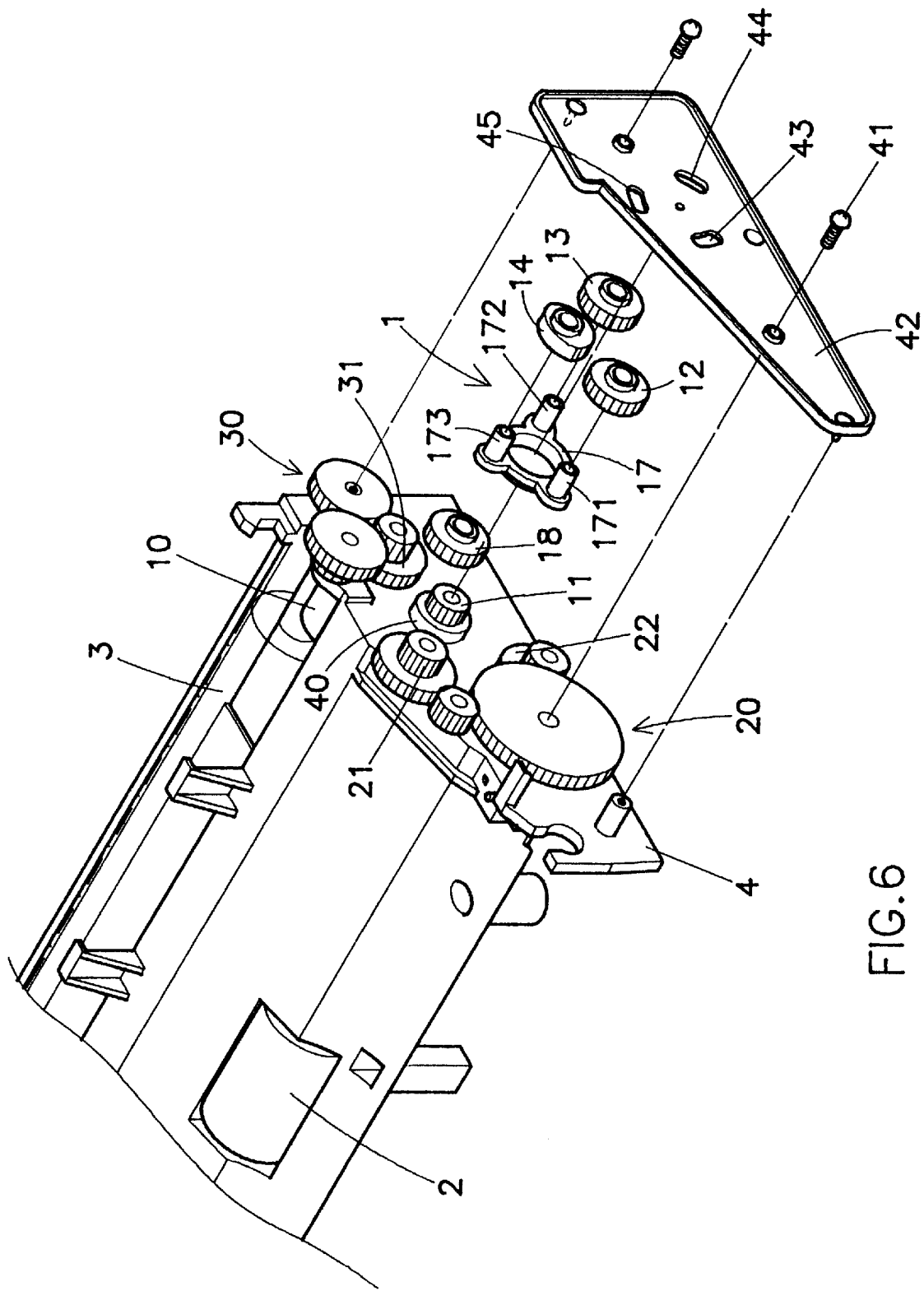
FIG. 6 is an exploded view of an alternate form of the gear transmission unit according to the present invention.

FIG. 6 shows an alternate form of the present invention, in which the aforesaid first annular gear holder 15 and second annular gear holder 16 are eliminated, and an annular gear holder 17 with three upright gear shafts 171, 172, 173 is revolvably mounted around the rounded seat 40 to hold the planet gears 12, 13 and the sector gear 14.

It is to be understood that various modifications and changes could be made thereunto without departing from the spirit and scope of the invention disclosed.

We claim:

1. A paper advancement system for an office machine operable in a plurality of operational modes comprising:
   (a) a machine base frame;
   (b) a first roller assembly coupled to said machine base frame for advancing a paper article engaged therewith in at least one of a plurality of advancement directions responsive to said operational mode of said office machine, said first roller assembly including a first roller portion extending axially from a first driven gear set;
   (c) a second roller assembly coupled to said machine base frame for advancing a paper article engaged therewith in at least one of said plurality of advancement directions responsive to said operational mode of said office machine, said second roller assembly including a second roller portion extending axially from a second driven gear set;
   (d) a gear transmission assembly coupled to said machine base frame for driving said first and second roller assemblies, said gear transmission assembly including:
      (1) a motor;
      (2) a substantially round seat member projecting from said machine base frame;
      (3) a drive gear member driven by said motor, said drive gear member being coaxially disposed relative to said seat member;
      (4) gear holder means rotatably coupled to said seat member, said gear holder means having first, second, and third upright gear shafts projecting therefrom;
      (5) an auxiliary gear member mounted to said machine base frame;
      (6) a first planet gear member rotatably coupled to said first upright gear shaft of said gear holder means, said first planet gear engaging said drive gear member and said first driven gear set;
      (7) a second planet gear member rotatably coupled to said second upright gear shaft of said gear holder means, said second planet gear member engaging said drive and auxiliary gear members and said second driven gear set; and,
      (8) a sector gear member rotatably coupled to said third upright gear shaft of said gear holder means, said sector gear member engaging said drive gear member and said second driven gear set; and,
   (e) a cover mounted to said machine base frame, said cover having at least three arcuate slots formed therein, said cover receiving respectively through said arcuate slots said first, second, and third upright gear shafts of said gear holder means for guiding the angular displacement thereof;
   whereby said first and second planet and said sector gear members are adapted for angular displacement relative to said first and second driven gear sets.

2. The paper advancement system as recited in claim 1 wherein said gear holder means includes an annular portion for coaxially engaging said seat member.

3. The paper advancement system as recited in claim 1 wherein said gear holder means includes:
   (a) a first annular gear holder member rotatably coupled to said seat member, said first annular gear holder member having said first upright gear shaft projecting therefrom; and,
   (b) a second annular gear holder member rotatably coupled to said seat member, said second annular gear holder member having said second and third upright gear shafts projecting therefrom.

* * * * *